(12) United States Patent
Zlatar

(10) Patent No.: US 8,528,274 B2
(45) Date of Patent: Sep. 10, 2013

(54) NOISE ATTENUATING AND VIBRATION DAMPENING PEDESTAL FOR AN ACCESS FLOOR ASSEMBLY

(76) Inventor: Petar Zlatar, Seven Hills (AU)

( * ) Notice: Subject to any disclaimer, the term of this patent is extended or adjusted under 35 U.S.C. 154(b) by 0 days.

(21) Appl. No.: 13/264,872

(22) PCT Filed: Apr. 16, 2010

(86) PCT No.: PCT/AU2010/000419
§ 371 (c)(1),
(2), (4) Date: Dec. 27, 2011

(87) PCT Pub. No.: WO2010/118468
PCT Pub. Date: Oct. 21, 2010

(65) Prior Publication Data
US 2012/0097826 A1    Apr. 26, 2012

(30) Foreign Application Priority Data

Apr. 17, 2009    (AU) .................................. 2009901637

(51) Int. Cl.
*E04B 9/00* (2006.01)
*A47F 5/00* (2006.01)
*E04G 25/00* (2006.01)
*F16M 13/00* (2006.01)

(52) U.S. Cl.
USPC ....... 52/126.6; 248/354.3; 248/357; 248/644; 248/634

(58) Field of Classification Search
USPC .................. 248/161, 154, 188.1, 188.2, 351, 248/354.1, 354.3; 52/126.1, 126.5, 126.6, 52/126.7, 263
See application file for complete search history.

(56) References Cited

U.S. PATENT DOCUMENTS

| | | | |
|---|---|---|---|
| 2,870,812 A | 1/1959 | Heller | |
| 3,616,584 A | 11/1971 | Sartori | |
| 5,011,351 A | 4/1991 | Terry | |
| 5,186,501 A | 2/1993 | Maho | |
| 5,758,854 A * | 6/1998 | Shih | 248/354.3 |
| 5,791,096 A * | 8/1998 | Chen | 52/126.6 |
| 5,819,482 A * | 10/1998 | Belke et al. | 52/126.6 |
| 6,442,906 B1 * | 9/2002 | Hwang | 52/126.6 |
| 7,650,725 B2 * | 1/2010 | Mead | 52/263 |
| 2003/0089049 A1 | 5/2003 | Scissom | |
| 2007/0280802 A1 * | 12/2007 | Disantis et al. | 411/160 |

FOREIGN PATENT DOCUMENTS

| | | |
|---|---|---|
| AU | 2006 200759 B1 | 11/2006 |
| KR | 100871412 B1 | 12/2008 |

* cited by examiner

*Primary Examiner* — Daniel J Troy
*Assistant Examiner* — Muhammad Ijaz
(74) *Attorney, Agent, or Firm* — Abelman, Frayne & Schwab

(57) ABSTRACT

A pedestal (10) for an access floor assembly (34) has a stand portion and a head portion. The stand portion has a base plate (12) for resting upon a sub-floor, and a metal stem (14) extending upwardly therefrom. The head portion has a platform (16) for receiving thereon an edge region of one or more panels that define the surface of the access floor, a threaded metal shaft (18) extending downwardly therefrom, and a nut (38) which screwably engages the threaded metal shaft. The pedestal (10) is characterised in that it includes a flexible member (40) having noise attenuation and vibration dampening properties adapted to fit longitudinally between overlapping portions of the metal stem (14) and the metal shaft (18) and further adapted to lock the position of the nut (38) on the threaded metal shaft (18).

7 Claims, 4 Drawing Sheets

NOISE ATTENUATING AND VIBRATION DAMPENING PEDESTAL FOR AN ACCESS FLOOR ASSEMBLY

TECHNICAL FIELD

The present invention relates to access flooring and, in particular, to a noise attenuating and vibration dampening pedestal for supporting access floors.

BACKGROUND ART

Access flooring is a common feature of many computer, media and communication rooms. Being raised above a sub-floor by pedestals, access flooring provides underlying space to conceal and arrange cabling and other service items used to operate the computers or other interactive equipment located within the room. The interconnecting panels which define the surface of an access floor are designed to be readily taken up and rearranged, upon prior removal of any overlying carpet or other floor coverings, when upgrading of the computers and other interactive equipment is required.

However, a problem with prior art pedestals used in access floor assemblies is that height of the pedestals is not readily adjustable, making installation a time consuming process.

Another problem with prior art pedestals is that they made of metal and the impact shock of footsteps on the access floor are reflected back from the sub-floor to the feet walking on the access floor. These prior art pedestals may also conduct noise to the floors beneath the sub-floor.

Yet another problem with prior art pedestals is that they are relatively expensive because they comprise numerous components which make manufacturing and assembling the pedestals a relatively time consuming process.

It is, therefore, an object of the present invention to overcome, or at least substantially ameliorate, the problems of prior art pedestals for access floors.

DISCLOSURE OF INVENTION

According to the present invention there is provided a pedestal for an access floor assembly, the pedestal comprising:
(a) a stand portion having
  (i) a base plate for resting upon a sub-floor, and
  (ii) a metal stem extending upwardly therefrom,
(b) a head portion having
  (i) a platform for receiving thereon an edge region of one or more panels that define the surface of the access floor,
  (ii) a threaded metal shaft extending downwardly therefrom, and
  (iii) a nut which screwably engages the threaded metal shaft, and
wherein the pedestal includes a resilient member having noise attenuation and vibration dampening properties disposed longitudinally between overlapping portions of the metal stem and the metal shaft and which is adapted to lock the position of the nut on the threaded metal shaft.

Preferably, the pedestal further comprises a resilient washer located between resilient member and the metal stem. The resilient member and resilient washer may be made of rubber.

The resilient member may also have a plurality of nodules on its inner surface adapted to prevent the rotation of the resilient member on the metal stem.

The pedestal may include a metal washer located between the resilient washer and the metal stem, to prevent the degradation of the rubber washer on the metal stem.

According to another aspect of the invention there is provided a height adjustable pedestal for an access floor assembly, the pedestal comprising:
(a) a stand which is adapted to support the pedestal and
(b) a head which is adapted to receiving thereon, an edge region of one or more panels that define the surface of the access floor, and wherein the pedestal includes noise attenuation means which has a first resilient member positioned such that it separates the head and the stand of the pedestal so as to reduce the transmission of vibrations and noise between the panels of the access floor and the stand of the pedestal.

Preferably, the first resilient member is adapted to engage a nut which engages a threaded shaft of the head, and wherein the engagement of the nut by the second resilient member holds the nut in place on the threaded shaft.

The noise attenuation means may also include a second resilient member that is fixed to or is contiguous with the top surface of the head and which separates the head from the panels of the access floor. The first and second resilient members may be made of rubber.

BEST MODE FOR CARRYING OUT THE INVENTION

Figures 1, 2:
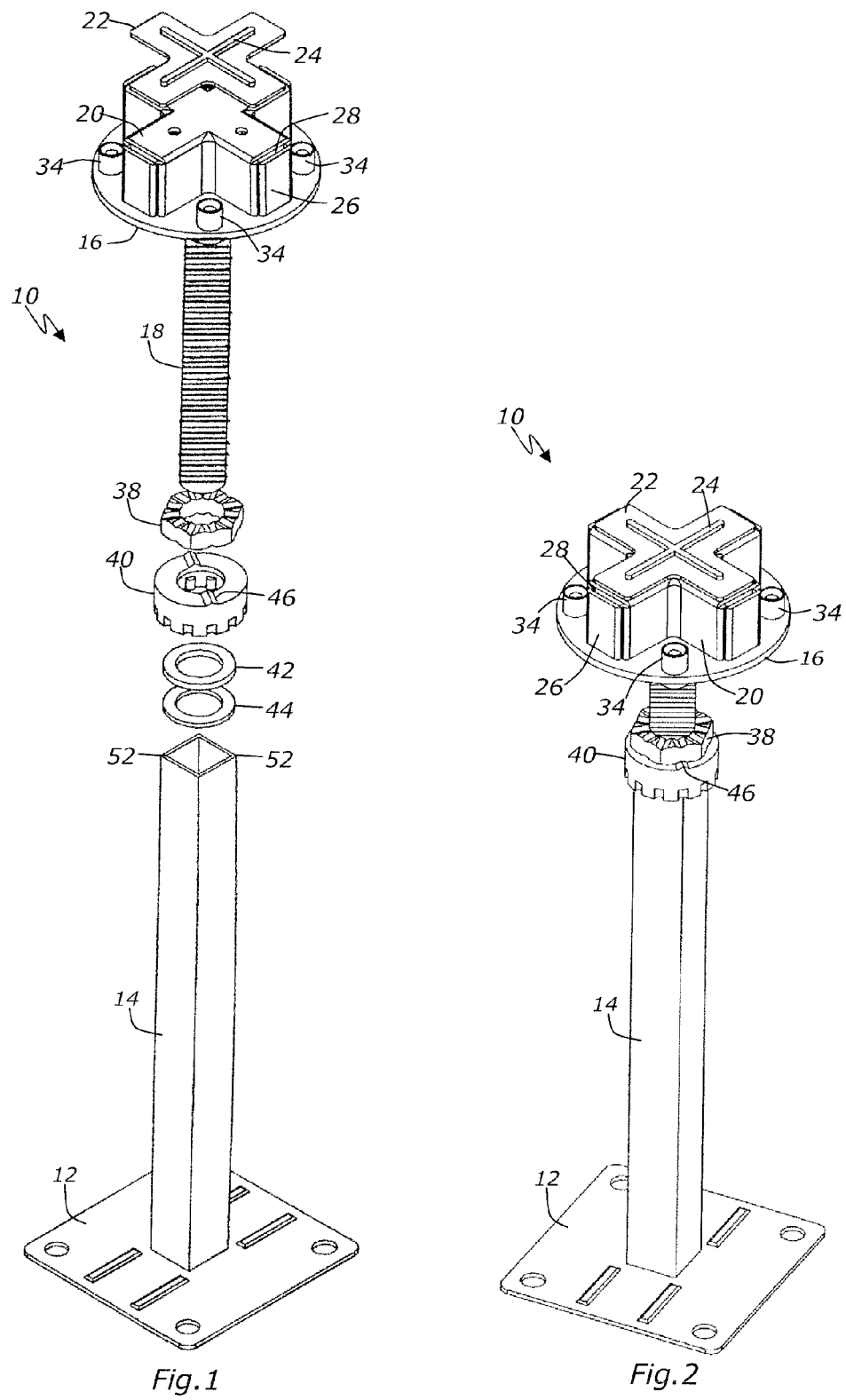
FIG. 1 is an exploded perspective view of a pedestal according to a preferred embodiment of the present invention.
FIG. 2 is an assembled view of the pedestal of FIG. 1.

The pedestal 10 shown in FIGS. 1 and 2 broadly comprises a stand portion and a head portion.

The stand portion comprises a base plate 12 for resting upon a sub-floor, and a stem 14 extending upwardly therefrom. In this embodiment, the base plate 12 is made of metal and is substantially square shaped with rounded corners. The stem 14 is hollow and has a rectangular shape and is preferably also made of metal. The stem 14 is welded centrally to the base plate 12.

The head portion comprises a platform 16 for receiving thereon an edge region of one or more of the access floor panels 34 and a shaft 18 extending downwardly therefrom. Both the platform 16 and the shaft 18 is preferably made of metal. The platform 16 includes a boss 20 which extends upwardly from the platform 16. The boss 18 is a cruciform shape and may be made of metal. A divider panel 22 with raised ribbing 24 thereon is engaged to the uppermost surface of the boss 20. The divider panel 22 is preferably made of plastic or rubber in order to have noise attenuation and vibration dampening properties.

Figure 6:
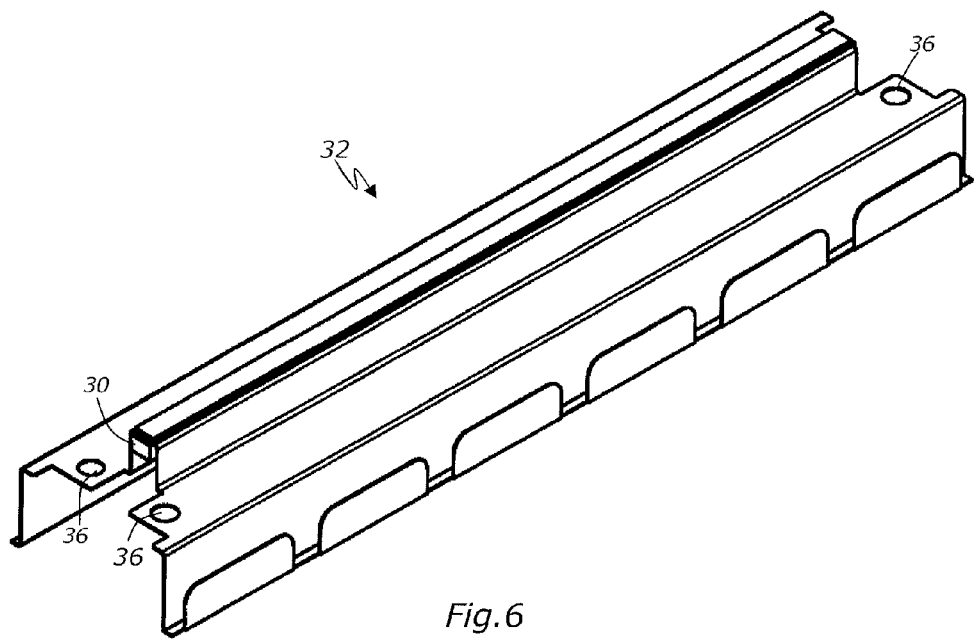
FIG. 6 is a perspective view of a stringer for use with the pedestal of FIG. 1.
Figure 7:
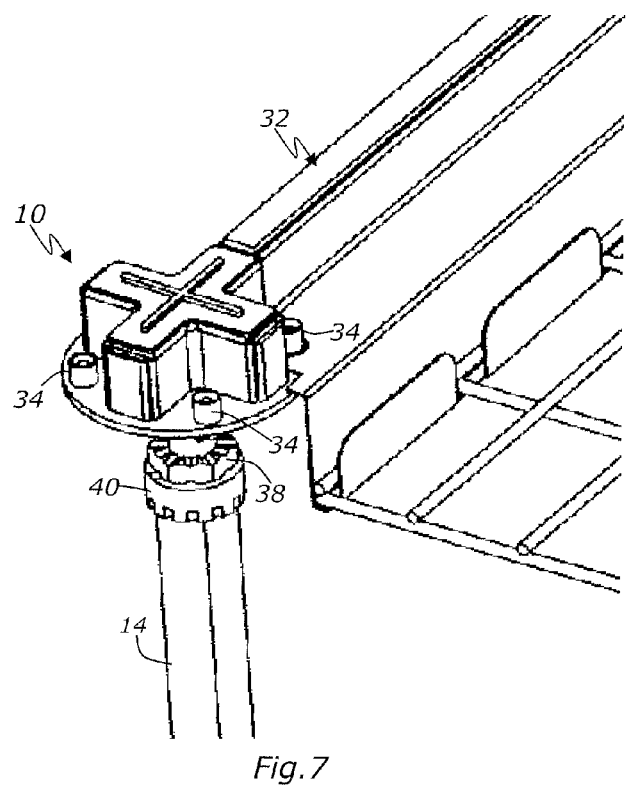
FIG. 7 is a perspective view of the stringer of FIG. 6 connected to the pedestal of FIG. 1.
Figure 8:
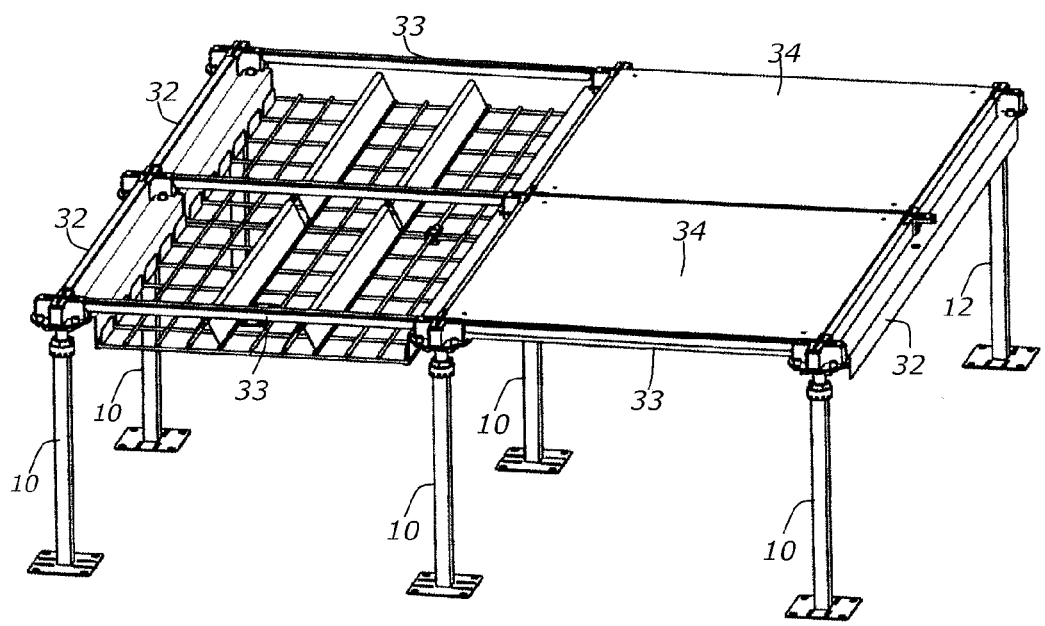
FIG. 8 is a perspective view of the pedestal of FIG. 1 in an access floor assembly.

Extending outwardly from each of the four arms of the boss 20 is a slotted seat 26 that defines a slot 28. Each of the slots 28 is adapted to receive the clip 30 of a stringer 32 (see FIG. 6). The knobs 34 on the pedestal 10 are inserted into holes 36 on the stringer 32 (see FIG. 7). The pedestal 10, stringers 32 and stringers 33 cooperate to support access floor panels 34 (see FIG. 8).

The shaft 18 of the head portion is threaded and screwably engages the nut 38. The platform 16 of the head portion has a threaded aperture (not shown) at its underside and within which the top of the shaft 18 is screwably engaged and fixed into position during assembly of the pedestal 10. The platform 16 may be made by die casting.

A resilient member 40 and a resilient washer 42 fit longitudinally between overlapping portions of the stem 14 and the shaft 18 so as to isolate the stem 14 from contact with the shaft 18. The resilient member 40 and resilient washer 42 are preferably made of rubber or a plastic polymer or some other substance which has resilient properties, so as to have noise attenuation and vibration dampening properties.

The resilient washer 42 sits on top of a metal washer 44 which in turn sits on top of the stem 14. The metal washer 44 prevents the degradation of the resilient washer 42 on the rectangular shaped stem 14.

The present invention has less working components than prior art pedestals and is therefore quicker to manufacture and assemble and is thereby cheaper to produce than prior art pedestals.

The height of the pedestal 10 is determined by the location of the nut 38 along the shaft 18, as the nut 38 adjusts the extent to which the stem 14 overlaps or extends into the shaft 18.

Figure 3:
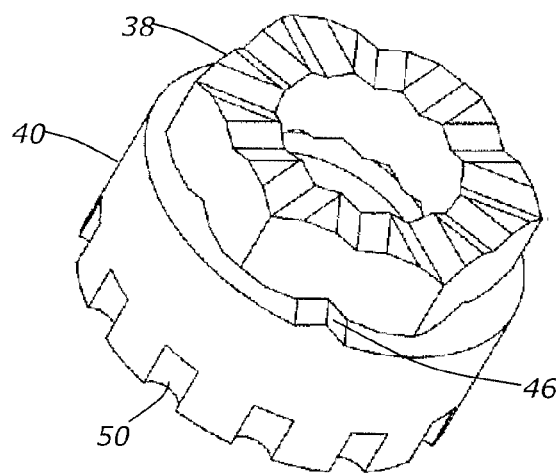
FIG. 3 is a perspective view of the resilient member and nut of FIGS. 1 and 2.
Figure 4:
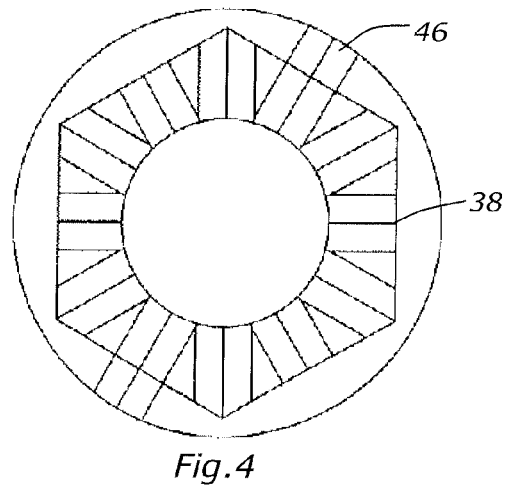
FIG. 4 is a top view of the nut and the resilient member of FIGS. 1, 2 and 3.
Figure 5:
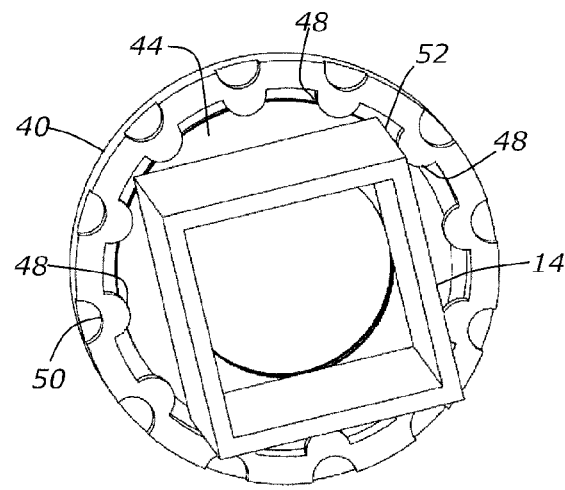
FIG. 5 is a bottom perspective view of the rubber member, metal washer and metal stem of FIG. 1 to 4.

The resilient member 40 locks the position of the nut 38. A ridge 46 on the resilient member 40 mateably engages with any one of the grooves on the nut 38, as shown in FIGS. 3 and 4. Referring to FIG. 5, the resilient member 40 is held in position on the stem 14 by interior nodules 48 which are designated by exterior markers 50. The vertices 52 of the rectangular shaped stem 14 are each gripped between two interior nodules 48 of resilient member 40, which prevents the resilient member 40, and thereby the nut 38, from rotating on the rectangular shaped stem 14.

To adjust the height of the pedestal 10, a user raises the shaft 18 out of the stem 14, adjusts the position of the nut 38, positions the resilient member 40 beneath the nut 38, and then lowers the shaft 18 into the stem 14. The pedestal 10 is therefore quickly and readily adjustable.

Various modifications may be made in details of design and construction without departing from the scope and ambit of the invention.

INDUSTRIAL APPLICABILITY

The present invention has an industrial application in the construction industry for commercial, industrial and office building environments which require access floors for particular applications.

The invention claimed is:

1. A pedestal for an access floor assembly, the pedestal comprising:
   (a) a stand portion having
      (i) a base plate for resting upon a sub-floor, and
      (ii) a metal stem extending upwardly therefrom and having a rectangular shape that defines four vertices,
   (b) a head portion having
      (i) a platform for receiving thereon an edge region of one or more panels that define the surface of the access floor,
      (ii) a threaded metal shaft extending downwardly therefrom, and
      (iii) a nut which screwably engages the threaded metal shaft, and
   wherein the pedestal includes a resilient member disposed longitudinally between overlapping portions of the metal stein and the metal shaft, the resilient member having a ridge which mateably engages with a groove on the nut so as to lock the position of the nut on the threaded metal shaft, and wherein the resilient member has a plurality of nodules on its inner surface, at least two vertices of the metal stem being gripped between respective pairs of the nodules so as to prevent the rotation of the resilient member and the nut on the metal stem.

2. The pedestal of claim 1, further comprising a resilient washer located between the resilient member and the metal stem.

3. The pedestal of claim 2, wherein the resilient washer is made of rubber.

4. The pedestal of claim 2, further comprising a metal washer located between the resilient washer and the metal stem, to prevent the degradation of the resilient washer on the metal stem.

5. The pedestal of claim 1, wherein the resilient member comprises first noise attenuation means so as to reduce the transmission of vibrations and noise between the panels of the access floor and the stand portion of the pedestal.

6. The pedestal of claim 5, further comprising a second resilient member that is fixed to or is contiguous with a top surface of the head portion and which separates the head portion from the panels of the access floor, wherein the second resilient member comprises second noise attenuation means so as to reduce the transmission of vibrations and noise between the panels of the access floor and the head portion of the pedestal.

7. The pedestal of claim 6, wherein the second resilient member is made of rubber.

\* \* \* \* \*